United States Patent
Hardin (10) Patent No.: US 11,408,447 B2
(45) Date of Patent: Aug. 9, 2022

(54) METHODS AND SYSTEMS FOR IMPROVING THE OPERATION OF TRANSMISSIONS FOR MOTOR VEHICLES

(71) Applicant: David A Hardin, El Monte, CA (US)

(72) Inventor: David A Hardin, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 516 days.

(21) Appl. No.: 16/405,333

(22) Filed: May 7, 2019

(65) Prior Publication Data
US 2019/0376599 A1 Dec. 12, 2019

Related U.S. Application Data

(60) Provisional application No. 62/683,277, filed on Jun. 11, 2018.

(51) Int. Cl.
*F15B 13/04* (2006.01)
*F16H 61/02* (2006.01)
(Continued)

(52) U.S. Cl.
CPC ..... *F15B 13/0402* (2013.01); *F16H 61/0267* (2013.01); *F16H 61/0276* (2013.01); *F16K 1/48* (2013.01); *F16K 1/482* (2013.01); *F16K 1/487* (2013.01); *F16K 11/10* (2013.01); *F16K 11/12* (2013.01); *F16K 27/02* (2013.01); *G05D 16/2024* (2019.01); *F16H 2061/0062* (2013.01); *F16H 2061/0279* (2013.01)

(58) Field of Classification Search
CPC .......... F16K 11/10; F16K 11/12; F16K 1/482; F16K 1/487; F16K 1/48; F16K 27/02; F15B 13/0402; F16H 2061/0279; F16H 2061/0062; G05D 16/2024
See application file for complete search history.

(56) References Cited

U.S. PATENT DOCUMENTS

| | | | |
|---|---|---|---|
| 4,316,599 A | * | 2/1982 | Bouvet ............... F16K 31/0613 251/129.08 |
| 4,449,426 A | | 5/1984 | Younger |

(Continued)

OTHER PUBLICATIONS

"Automatic Transaxle/Transmission—TorqShift", Ford motor Company, 307-01, dated Jul. 2, 2004.

(Continued)

*Primary Examiner* — Atif H Chaudry
(74) *Attorney, Agent, or Firm* — Mark P. Stone (57) ABSTRACT

The "factory installed" pressure regulator valve of an automotive transmission is replaced by a pressure regulator valve having two separate valve components conjointly movable together in a bore. A protrusion or protuberance extending from the center of one end of one of the valve components defines a fulcrum which abuts against an adjacent end of the other valve component as the two valve components move conjointly and in direct contact with each other within the bore during operation of the pressure regulator valve. Preferably, an opening is provided in a land in one of the valve components to vent hydraulic fluid (transmission oil) to prevent a pressure build-up in the bore which might separate the two valve components from each other during reciprocating movement of the valve components in the bore.

16 Claims, 11 Drawing Sheets

(51) Int. Cl.
*F16K 11/10* (2006.01)
*F16K 1/48* (2006.01)
*F16K 11/12* (2006.01)
*F16K 27/02* (2006.01)
*G05D 16/20* (2006.01)
*F16H 61/00* (2006.01)

(56) References Cited

U.S. PATENT DOCUMENTS

| | | | |
|---|---|---|---|
| 4,711,140 A | 12/1987 | Younger | |
| 4,790,938 A | 12/1988 | Younger | |
| 5,251,659 A * | 10/1993 | Sturman | F16K 31/06 137/625.5 |
| 5,253,549 A | 10/1993 | Younger | |
| 5,259,414 A * | 11/1993 | Suzuki | F15B 13/0402 137/625.65 |
| 5,540,628 A | 7/1996 | Younger | |
| 5,624,342 A | 4/1997 | Younger | |
| 5,730,685 A | 3/1998 | Younger | |
| 5,743,823 A | 4/1998 | Younger | |
| 5,768,953 A | 6/1998 | Younger | |
| 5,820,507 A | 10/1998 | Younger | |
| 5,947,155 A * | 9/1999 | Miki | G05D 16/2024 335/229 |
| 5,967,928 A | 10/1999 | Younger | |
| 6,099,429 A | 8/2000 | Younger | |
| 6,117,047 A | 9/2000 | Younger | |
| 6,179,005 B1 * | 1/2001 | Inami | F16K 31/0613 137/625.65 |
| 6,287,231 B1 | 9/2001 | Younger | |
| 6,390,944 B1 | 5/2002 | Younger | |
| 6,565,472 B1 | 5/2003 | Younger | |
| 6,699,157 B2 | 3/2004 | Younger | |
| 6,729,989 B2 | 5/2004 | Younger | |
| 6,814,680 B2 | 11/2004 | Younger | |
| 6,871,397 B2 | 3/2005 | Younger | |
| 6,913,554 B2 | 7/2005 | Younger | |
| 6,964,628 B2 | 11/2005 | Younger | |
| 7,128,679 B2 | 10/2006 | Younger | |
| 7,331,893 B2 | 2/2008 | Younger | |
| 9,429,228 B2 | 8/2016 | Younger | |
| 9,970,534 B2 | 5/2018 | Younger | |
| 2007/0145315 A1 * | 6/2007 | Uemura | F04B 27/1804 251/84 |

OTHER PUBLICATIONS

"Automatic Transaxle/Transmission—6F35", Ford Motor Company, 307-01A, dated Jun. 26, 2008.

"Automatic Transmission—6R60", Ford Motor Company, 307-01B, dated Dec. 23, 2005.

"Functional Description Automatic Transmission 6HP19/6HP26 BMW", ZF Car Driveline Technology, ZF Getriebe GmbH, dated Jul. 2.

* cited by examiner

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles, more commonly referred to as "factory installed" transmissions, installed in automotive vehicles by an original motor vehicle manufacturer. The invention is more particularly directed to improvements to the pressure regulator valve of the Ford 5R110W; 6F35; and 6R60-6R80 and the BMW ZF6HP-19 through 6HP-32 "factory installed" transmissions.

Operation of the aforementioned "factory installed" automotive transmissions are well known to and within the knowledge of persons skilled in the relevant art of automotive transmission operation and design. Descriptions and illustrations of these "factory installed" automotive transmissions are found in publications of the Ford Motor Company of Dearborn, Mich. identified as "Automatic Transaxle/Transmission-TorqShift", 307-01, Jul. 2, 2004 (5R110W); "Automatic Transmission-6R60", 307-01B, Dec. 23, 2005; and "Automatic TransaxleTransmission-6F35", 307-01A—Jun. 26, 2008), and publications by ZF Getriebe GmbH entitled "Functional Description" (ZF6HP-19 through 6HP-32 "factory installed" transmissions). Excerpts from these publications by the Ford Motor Company and ZF Getriebe GmbH describing and illustrating the aforementioned "factory installed" automotive transmissions are being filed concurrently herewith.

SUMMARY OF THE INVENTION

The "factory installed" pressure regulator valve of the Ford 5R110W; 6F35; and 6R60-6R80 and the BMW ZF6HP-19 through 6HP-32 "factory installed" transmissions are replaced by a pressure regulator valve having two separate valve components conjointly movable together in a bore. A protrusion or protuberance extending from one end of one of the valve components in a direction towards the other valve component defines a fulcrum which abuts against the adjacent end of the other valve component as the two valve components move conjointly and in direct contact with each other within the bore during operation of the pressure regulator valve. The fulcrum is preferably defined to extend from the center of the one end of the one valve component. Preferably, an opening is provided in a land in one of the valve components to vent hydraulic fluid (transmission oil) to prevent a pressure build-up in the bore which might separate the two valve components from each other during reciprocating movement of the valve components in the bore. Preferably, one of the valve components is larger than the other, and the protrusion defining the fulcrum extends from an end of the larger valve component. However, the protrusion defining the fulcrum can extend from either the larger or smaller of the two valve components. Moreover, although the two valve components are preferably a larger valve component and a smaller valve component, it is within the scope of the invention that the two valve components be of equal length.

The present invention is directed to an improved pressure regulator valve for an automotive transmission, an improved hydraulic circuit of an automotive transmission including the improved pressure regulator valve, and a method for modifying a "factory installed" automotive transmission to replace the "factory installed" pressure regulator valve with the improved pressure regulator valve of the present invention.

BEST MODES FOR CARRYING OUT THE INVENTION

Ford 5R110W

The factory installed Ford 5R110W transmission has a main pump cover which Is made from cast aluminum. It routes and regulates the output of the transmission oil pump.

It is subject to a pressure of 300 psi or greater in certain locations and modes of use, and up 15" of vacuum in other Locations and modes of use. This pump cover is also subject to large temperature variations in outside air temperature (−30° F. or less in Winter in northern Canada or 240° F. or greater in Summer in Southern Texas). Warp and distortion to the casting occurs from heating and cooling, and pressure and vacuum variations over time. The cover also houses the main Pressure Regulator Valve in a precision bored hole that is over 5" deep with bore to valve clearance of 0.001". When the casting becomes sufficiently distorted as a result of the above mentioned forces and operating conditions over the length of the valve, the valve becomes pinched in the bore and losses its ability to quickly move back and forth smoothly to meet current driving conditions. Transmission failure ultimately occurs.

One improvement of the present invention provides a new two piece replacement Pressure Regulator Valve (PRV) to reduce the pinching of the valve in the bore by allowing the two pieces to move with the bore distortion and providing a fulcrum point between the two pieces of the PRV. The new designed two component PRV continues to operate during conditions which would cause the original factory installed PRV to stick in the bore, such as the distortion of the pump cover or the valve bore. This solution greatly reduces the need for a replacement pump assembly and provides an easy and cost effective repair.

Figure 1A:
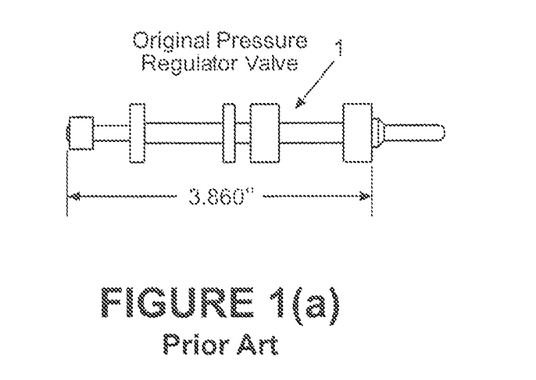
FIG. 1(a) illustrates a "factory installed" pressure regulator valve for an automotive transmission identified as 5R110W produced by the Ford Motor Company of Dearborn, Mich.
Figure 1B:
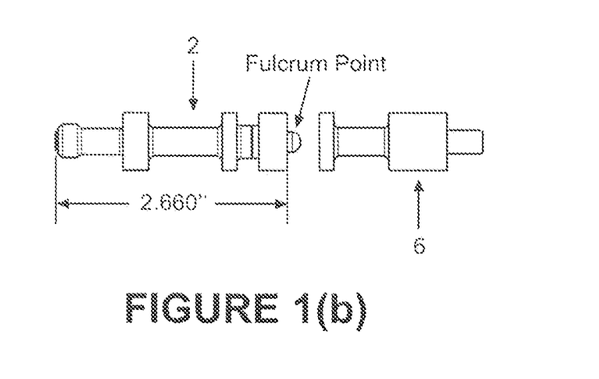
FIG. 1(b) illustrates a modification to the "factory installed" pressure regulator valve for an automotive transmission identified as 5R110W produced by the Ford Motor Company of Dearborn, Mich., in accordance with the present invention.

FIG. 1(a) of the drawing illustrates the single component "factory installed" pressure regulator valve (PRV) designated by reference numeral 1 for the 5R110W transmission, while FIG. 1(b) of the drawing illustrates the pressure regulator valve in accordance with the present invention having a first component designated by reference numeral 2 and a second component designated by reference numeral 6.

Figure 2:
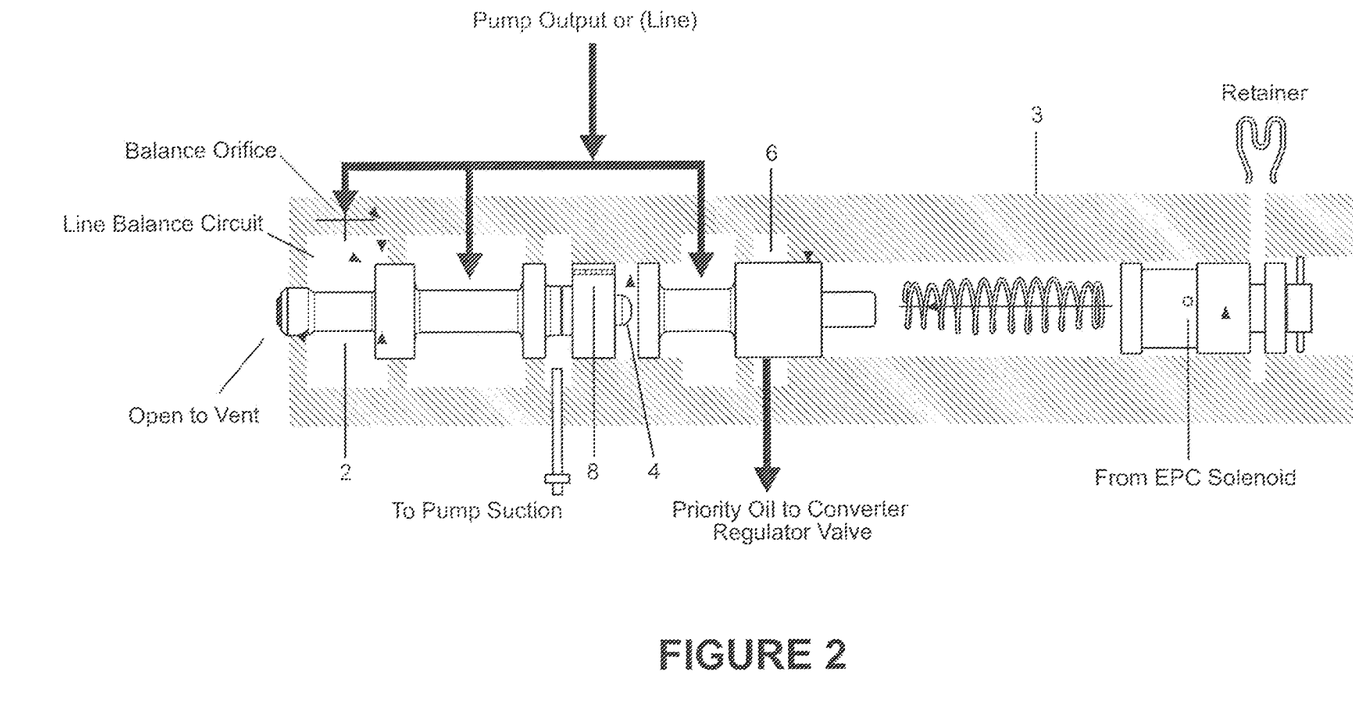
FIG. 2 illustrates the modified pressure regulator valve shown in FIG. 1(a) as arranged in its operating environment in the 5R110W automotive transmission.

As best shown in FIG. 2 of the drawing, a first larger valve component 2 of the split pressure regulator valve has a protrusion or protuberance 4 defining a fulcrum extending from the center of one end of the valve component 2 in a direction towards an adjacent end of a second valve component 6. In operation, the protrusion 4 abuts against the adjacent end of the second, smaller, valve component 6, and the valve components 2 and 6 move together conjointly in a reciprocating motion within a bore designated by reference numeral 3. An opening 8 is provided in a land of the first valve component 2 to vent transmission oil to prevent build up of fluid pressure to a value which would cause the first valve component 2 to separate from the second valve component 6 during operation of the pressure regulator valve. Accordingly, the two valve components will remain in direct contact with each other as them move in reciprocating motion within the valve bore 3.

Figure 3A:
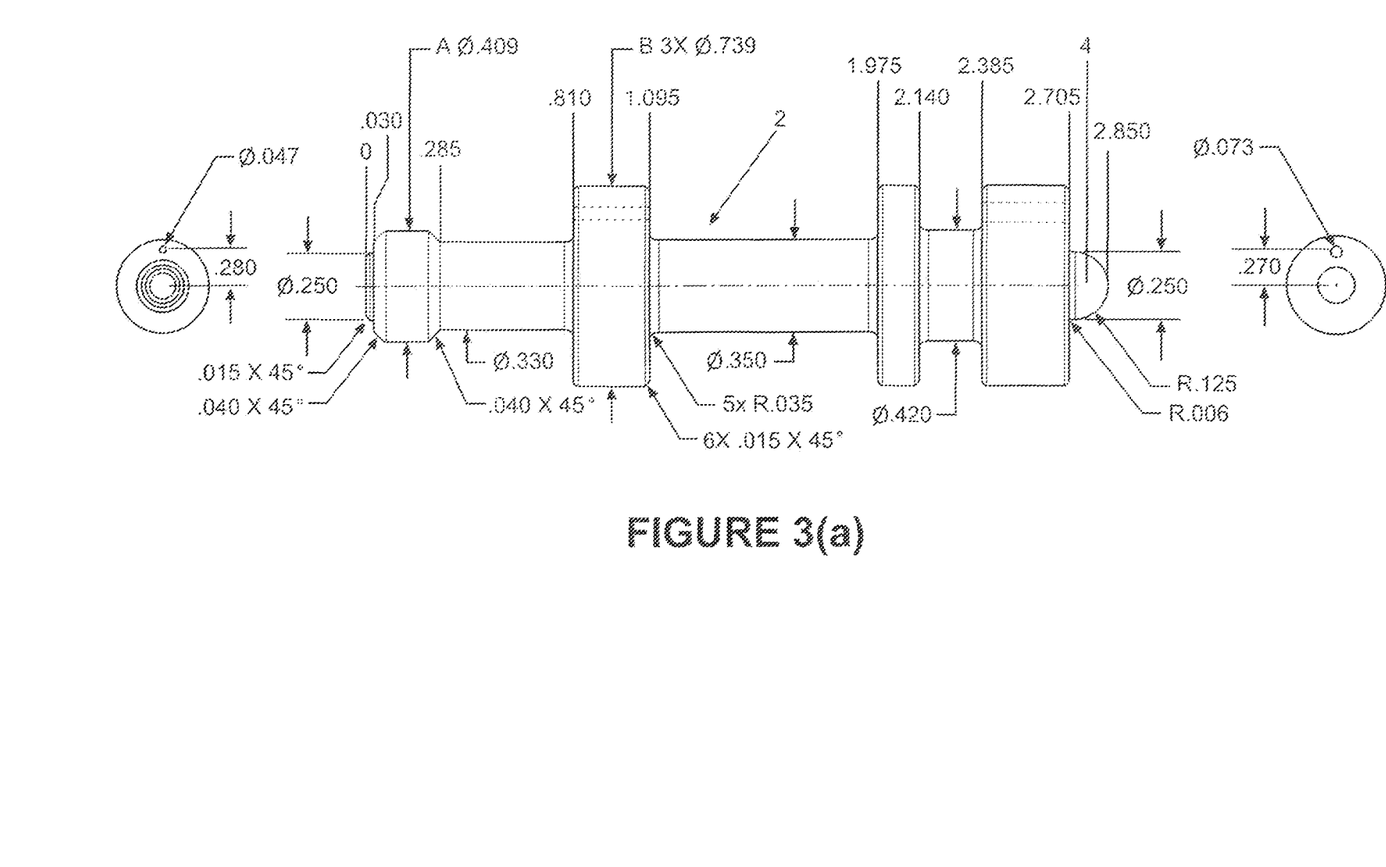
FIG. 3(a) illustrates the larger component of the modified pressure regulator valve in greater detail than shown in FIG. 1(b)
Figure 3B:
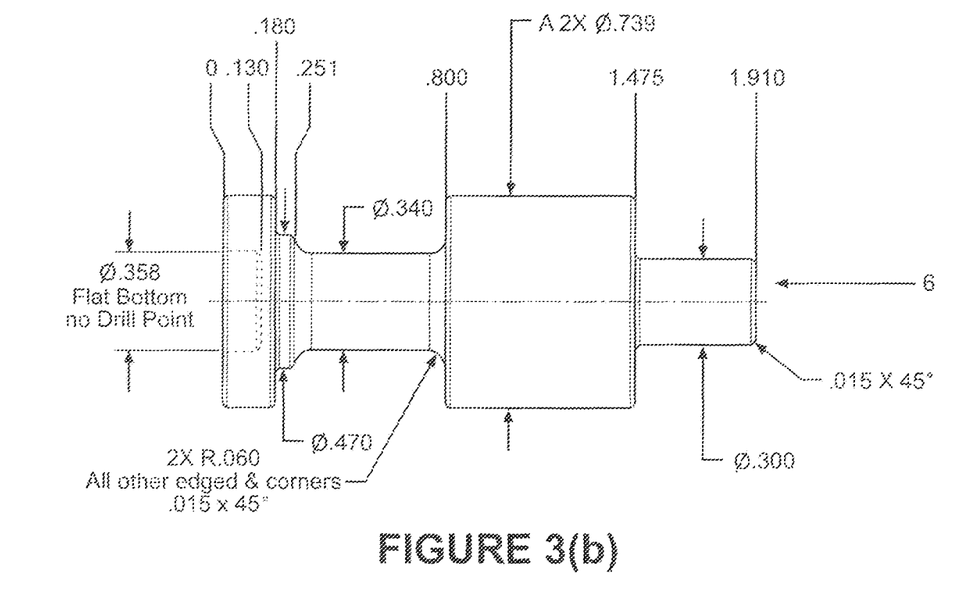
FIG. 3(b) illustrates the smaller component of the modified pressure regulator valve in greater detail than shown in FIG. 1(b)

FIG. 3(a) of the drawing illustrates the valve component 2 in greater detail, and FIG. 3(b) of the drawing illustrates the valve component 6 in greater detail.

Ford 6F35

The factory installed Ford 6F35 transmission has a main pump cover which Is made from cast aluminum. It routes and regulates the output of the transmission oil pump. It is subject to a pressure of 300 psi or greater in certain locations and modes of use, and up 15" of vacuum in other locations and modes of use. This pump cover is also subject to large temperature variations in outside air temperature (−30° F. or less in Winter in northern Canada or 240° F. or greater In Summer in Southern Texas). Warp and distortion to the casting occurs from heating and cooling, and pressure and vacuum variations, over time. The cover also houses the main Pressure Regulator Valve in a precision bored hole that is over 4" deep with bore to valve clearance of 0.001". When the casting becomes sufficiently distorted as a result of the above mentioned forces and operating conditions over the length of the valve, the valve becomes pinched in the bore and losses its ability to quickly move back and forth smoothly to meet current driving conditions. Transmission failure ultimately occurs.

One improvement of the present invention provides a new two piece replacement Pressure Regulator Valve (PRV) to reduce the pinching of the valve in the bore by allowing the two pieces to move with the bore distortion and providing a fulcrum point between the two pieces of the PRV. The new designed two component PRV continues to operate during conditions which would cause the original factory installed PRV to stick in the bore, such as distortion of the pump cover or the valve bore. This solution greatly reduces the need for a replacement pump assembly and provides an easy and cost effective repair.

Figure 4A:
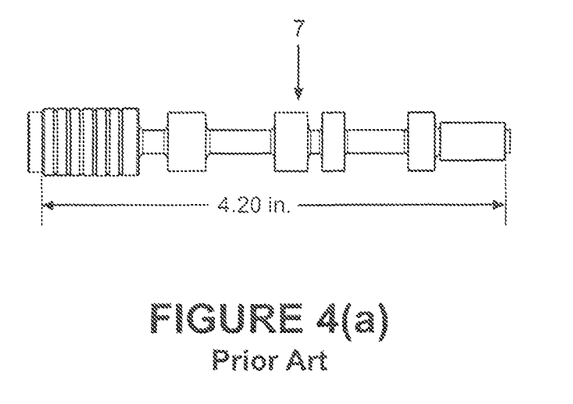
FIG. 4(a) illustrates a "factory installed" pressure regulator valve for an automotive transmission identified as 6F35 produced by the Ford Motor Company of Dearborn, Mich.
Figure 4B:
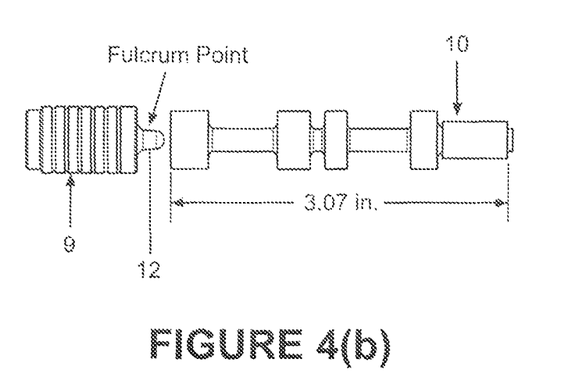
FIG. 4(b) illustrates a modification to the "factory installed" pressure regulator valve for an automotive transmission identified as 6F35 produced by the Ford Motor Company of Dearborn, Mich., in accordance with the present invention.

FIG. 4(a) of the drawing illustrates the single component "factory installed" pressure regulator valve designated by reference numeral 7 of the Ford 6F35 transmission, while FIG. 4(b) of the drawing illustrates the pressure regulator valve in accordance with the present invention having a first component designated by reference numeral 9 and a second component designated by reference numeral 10.

One of the valve components, in this case the smaller valve component 9, of the split pressure regulator valve, has a protrusion or protuberance 12 defining a fulcrum extending from the center of one end of the valve component 9 in a direction towards an adjacent end of a second valve component 10. In operation, the protrusion 12 abuts against the adjacent end of the second, larger, valve component 10, and the valve components 9 and 10 move conjointly together in a reciprocating motion within a bore. Preferably, an opening is provided in a land of one of the valve components to vent transmission oil to prevent build up of fluid pressure to a value which would cause the first valve component 9 to separate from the second valve component 10 during operation of the pressure regulator valve. Accordingly, the two valve components will remain in direct contact with each other as them move in reciprocating motion within the valve bore.

Figure 5A:
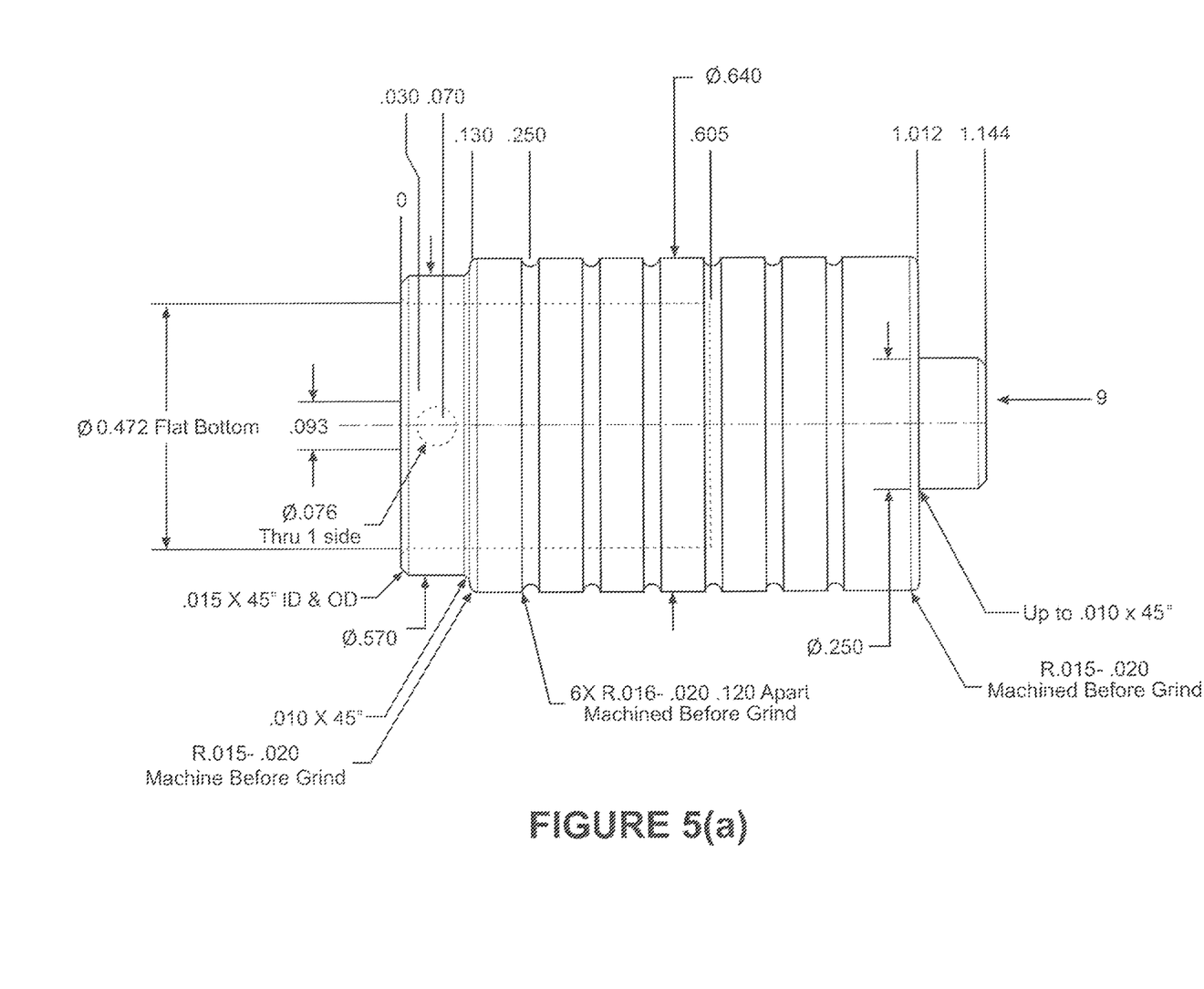
FIG. 5(a) illustrates the smaller component of the modified pressure regulator valve in greater detail than shown in FIG. 4(b)
Figure 5B:
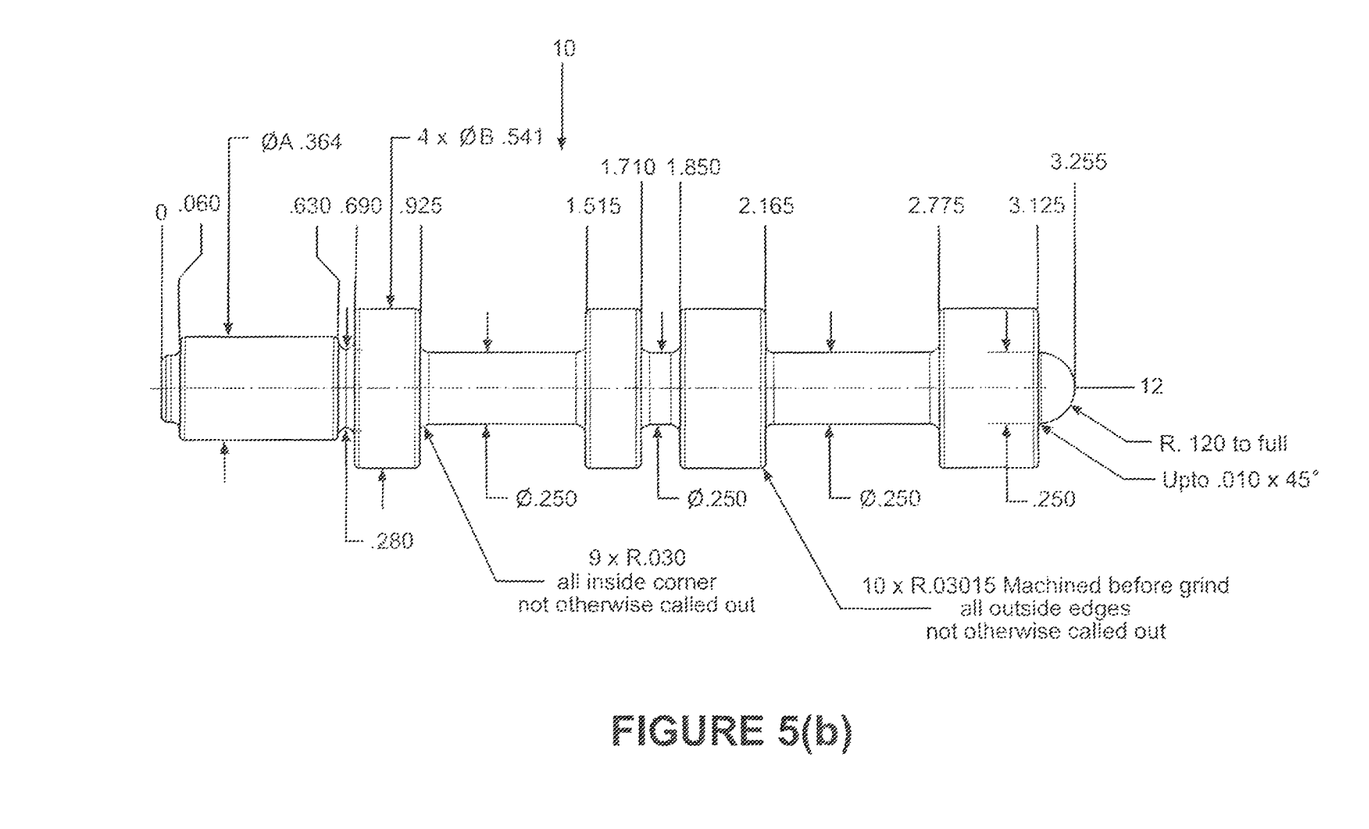
FIG. 5(b) illustrates the larger component of the modified pressure regulator valve in greater detail than shown in FIG. 4(b)

FIG. 5(a) of the drawing illustrates the valve component 9 in greater detail, and FIG. 5(b) of the drawing illustrates the valve component 10 in greater detail. In FIGS. 5(a) and 5(b), the protrusion 12 defining the fulcrum is shown extending from the larger valve component 10, and not the smaller valve component 9, opposite to that illustrated in FIGS. 4(a) and 4(b).

Ford 6R60-6R80, and BMW ZF 6HP-19-6HP-32

The factory installed Ford 6R60-6R80, and the factory installed BMW ZF 6HP-19-6HP-32, transmissions have a main pump cover which is made from cast aluminum. It routes and regulates the output of the transmission oil pump. It is subject to a pressure of 300 psi or greater in certain locations and modes of use, and up 15" of vacuum in other locations and modes of use. This pump cover is also subject to large temperature variations in outside air temperature (−30° F. or less in Winter in northern Canada or 240° F. or greater In Summer in Southern Texas). Warp and distortion to the casting occurs from heating and cooling, and pressure and vacuum variations, over time. The cover also houses the main Pressure Regulator Valve in a precision bored hole that is over 4¾" deep with bore to valve clearance of 0.001" on 3 different diameters. When the casting sufficiently distorts as a result of the above mentioned forces and operating conditions over the length of the valve, the valve wears into the bore and losses its ability to seal the bore on the left end creating a leak in the VFS 5 circuit to vent. Adding a longer land to the pressure regulator valve to reseal the leak does not solve the problem but exacerbates it because the longer valve is more susceptible to distortion.

One improvement of the present invention provides a new two piece replacement Pressure Regulator Valve (PRV) to reduce the pinching of the valve in the bore by allowing the two pieces to move with the bore distortion and providing a fulcrum point between the two pieces of the PRV. The new designed two component PRV continues to operate during conditions which would cause the original factory installed PRV to stick in the bore, such as distortion of the pump cover or the valve bore. This solution greatly reduces the need for a replacement pump assembly and provides an easy and cost effective repair.

Figure 6A:
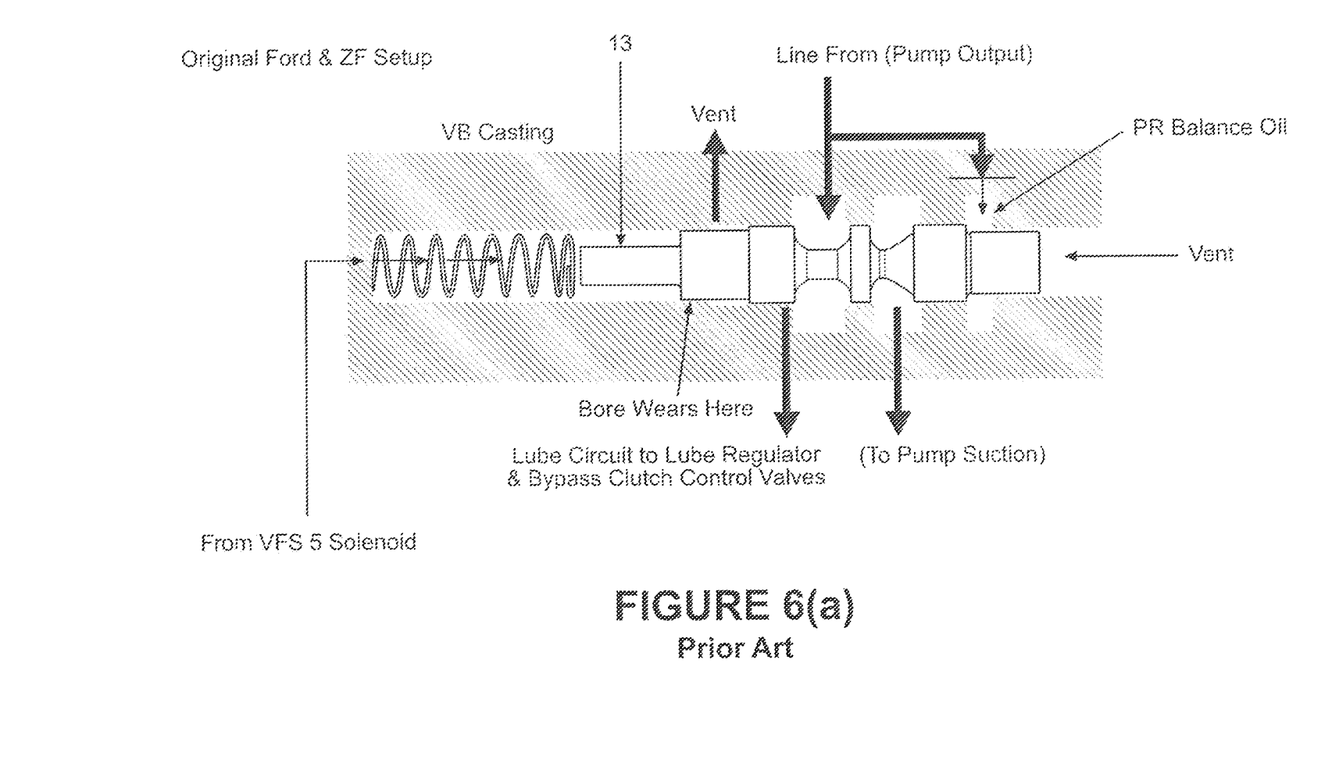
FIG. 6(a) illustrates a "factory installed" pressure regulator valve for automotive transmissions identified as 6R60-6R80 produced by the Ford Motor Company of Dearborn, Mich., and the "factory installed" pressure regulator valve for ZF 6HP-19-6HP-32 automotive transmissions installed in BMW motor vehicles, as arranged in their operating environment in the 6R60-6R80 and ZF 6HP-19-6HP-32 automotive transmissions.
Figure 6B:
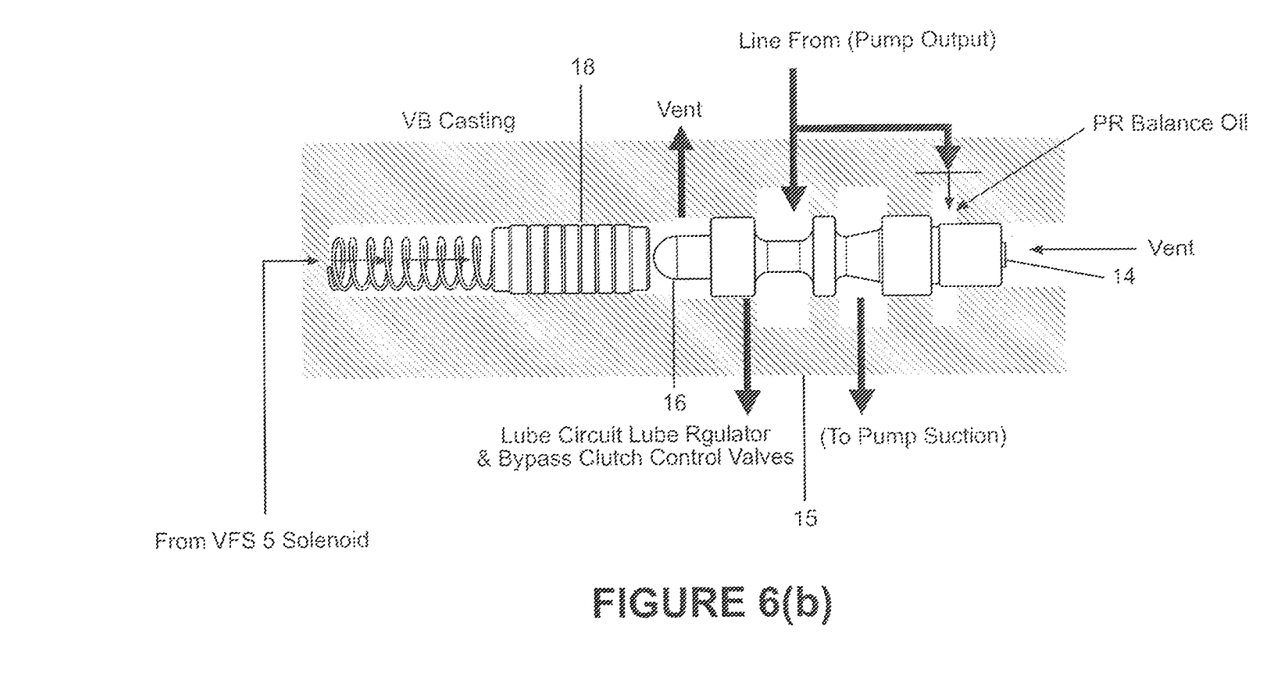
FIG. 6(b) illustrates a modification to the "factory installed" pressure regulator valve for an automotive transmissions identified as 6R60-6R80 produced by the Ford Motor Company of Dearborn, Mich., and the "factory installed" pressure regulator valve for ZF 6HP-19-6HP-32 automotive transmissions installed in BMW motor vehicles, as arranged in their operating environments in the 6R60-6R80 and ZF 6HP-19-6HP-32 automotive transmissions, in accordance with the present invention.

FIG. 6(*a*) of the drawing illustrates the single component "factory installed" pressure regulator valve designated by reference numeral 13 for the Ford 6R60-6R80 and the BMW ZF 6HP-19-6HP-32 transmissions, while FIG. 6(*b*) of the drawing illustrates the pressure regulator valve in accordance with the present invention having a first component designated by reference numeral 14 and a second component designated by reference numeral 18.

As best shown in FIG. 6(*b*) of the drawing, a first larger valve component 14 of the split pressure regulator valve has a protrusion or protuberance 16 defining a fulcrum extending from the center of one end of the valve component 14 in a direction towards an adjacent end of a second valve component 18. In operation, the protrusion 16 abuts against the adjacent end of the second, smaller, valve component 18, and the valve components 14 and 18 move together conjointly in a reciprocating motion within a bore designated by reference numeral 15. An opening is provided in one of the valve components to vent transmission oil to prevent build up of fluid pressure to a value which would cause the first valve component 14 to separate from the second valve component 18 during operation of the pressure regulator valve. Accordingly, the two valve components will remain in direct contact with each other as them move in reciprocating motion within the valve bore 15.

Figure 7A:
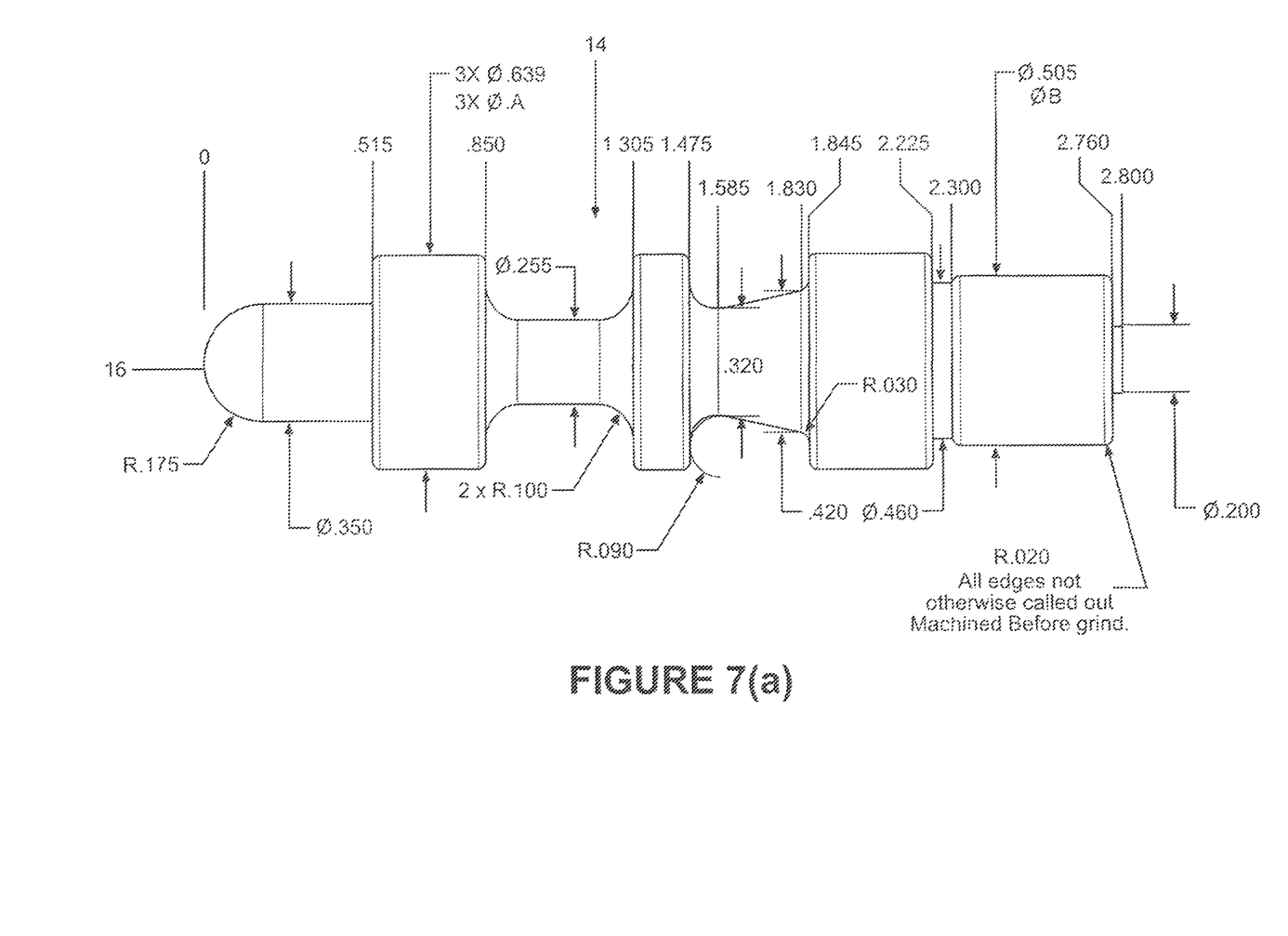
FIG. 7(a) illustrates the larger component of the modified pressure regulator valve in greater detail than shown in FIG. 6(b)
Figure 7B:
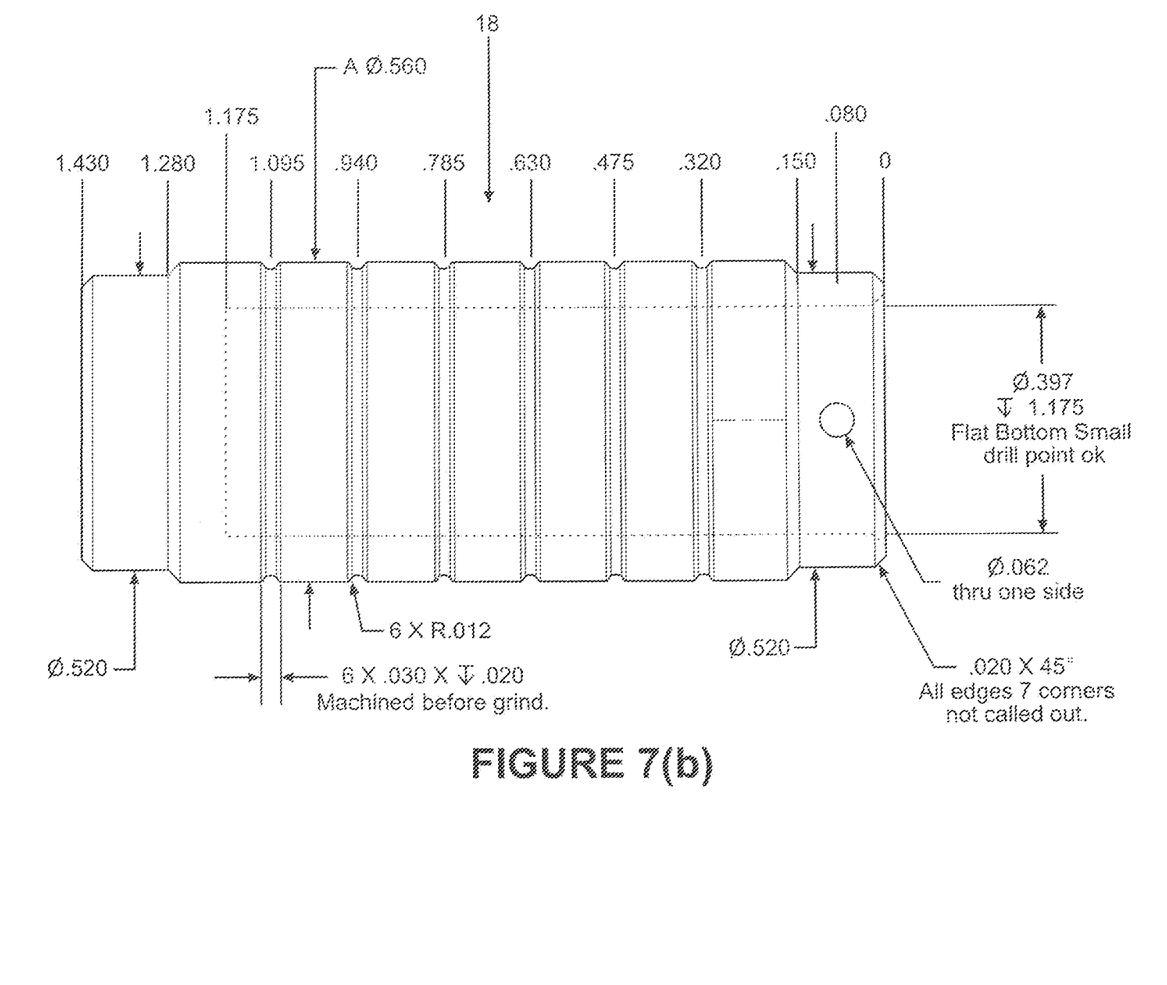
FIG. 7(b) illustrates the smaller component of the modified pressure regulator valve in greater detail than shown in FIG. 6(b).

FIG. 7(*a*) of the drawing illustrates the valve component 14 in greater detail, and FIG. 7(*b*) of the drawing illustrates the valve component 18 in greater detail.

The description of the preferred embodiments of the invention discussed and illustrated herein are intended to be exemplary only and not restrictive of the scope of the invention, that scope being defined by the following claims and all equivalents thereto.

The invention claimed is:

1. A pressure regulator valve for en automotive transmission, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly contacts the adjacent end of said second valve component as said first and second valve components reciprocally move in a valve bore, wherein at least one of said first and second valve components defines a vent opening, wherein said vent opening is defined in a land of said at least one valve component, wherein the size of said vent opening is selected such that fluid pressure in said at least one valve component does not exceed a predetermined fluid pressure so as to prevent said first and second valve components from disengaging from each other during reciprocal movement of said first and second valve components in said bore.

2. The pressure regulator valve as claimed in claim 1, wherein said first valve component is greater in length than said second valve component.

3. A pressure regulator valve for an automotive transmission, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly contacts the adjacent end of said second valve component as said first and second valve components reciprocally move in a valve bore, wherein the first and second valve components are of equal length.

4. An hydraulic circuit for an automotive transmission, said hydraulic circuit having a pressure regulator valve, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly contacts the adjacent end of said second valve component as said first and second valve components reciprocally move in a valve bore ,wherein at least one of said first and second valve components of said pressure regulator valve defines a vent opening , wherein said vent opening is defined in a land of said at least one valve component of said pressure regulator valve, wherein the size of said vent opening is selected such that fluid pressure in said at least one valve component does not exceed a predetermined fluid pressure so as to prevent said first and second valve components frown disengaging from each other during reciprocal movement of said first and second valve components in said valve bore.

5. The hydraulic circuit as claimed in claim 4, wherein said first valve component of said pressure regulator valve is greater in length than said second valve component of said pressure regulator valve.

6. An hydraulic circuit for an automotive transmission, said hydraulic circuit having ,a pressure regulator valve, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly contacts the adjacent end of said second valve component as said first and second valve components reciprocally move in a valve bore, wherein the first and second valve components of said pressure regulator valve are of equal length.

7. A method of modifying an automotive transmission having a pressure regulator valve formed from a single valve component, said method comprising the steps of:

replacing said single valve component pressure regulator valve with a replacement pressure regulator valve having separate first and second valve components, said first valve component having a protuberance defining a fulcrum extending from one end thereof in a direction towards an adjacent end of said second valve component, arranging said first and second valve components such that the fulcrum of said first valve component directly contacts the adjacent end of said second valve component as said first and second valve components reciprocally move in a valve bore, and defining a vent opening in a land of at least one of said first and second valve components.

8. The method as claimed in claim 7, including the step of selecting the size of said vent opening such that fluid pressure in said at least one valve component does not exceed a predetermined fluid pressure so as to prevent said first and second valve components from disengaging from each other during reciprocal movement of said first and second valve components in said valve bore.

9. The method as claimed in claim 7, including the step of selecting the length of said first valve component to be greater than the length of said second valve component.

10. The method as claimed in claim 7, including the step of selecting the length of said first and second valve components to be equal to each other.

11. The method as claimed in claim 7, wherein said automotive transmission is a FORD 5R110W.

12. The method as claimed in claim 7, wherein said automotive transmission is a FORD 6F35.

13. The method as claimed in claim 7, wherein said automotive transmission is a FORD 6R60-6R80 or a BMW ZF6HP-19-6HP-32.

14. A pressure regulator valve for an automotive transmission, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly and continuously contacts the adjacent end of said second valve component as said first and second valve components reciprocally move in a valve bore during operation of the pressure regulator valve, wherein a space between the outer surfaces of said first and second valve components and the inner surface of said valve bore surrounding said first and second valve components is sufficiently wide so as to enable relative pivoting of said first and second valve components on said fulcrum of said first valve component when said first and second valve components move through a distorted section of said valve bore.

15. The pressure regulator valve as claimed in claim 14, wherein at least one of said first and second valve components defines a vent opening wherein said vent opening is defined in a land of said at least one valve component, wherein the size of said vent opening is selected such that fluid pressure in said at least one valve component does not exceed a predetermined fluid pressure so as to prevent said first and second valve components from disengaging from each other during reciprocal movement of said first and second valve components in said bore.

16. A pressure regulator valve for an automotive transmission, said pressure regulator valve comprising separate first and second valve components, said first valve component having a protuberance defining a fulcrum extending from one end thereof in a direction towards an adjacent end of said second valve component, said first and second valve components being arranged such that the fulcrum of said first valve component directly and continuously contacts the adjacent end of said second valve component as said first and second valve components reciprocally move in a valve bore during operation of the pressure regulator valve, wherein at least one of said first and second valve components defines a vent opening , wherein said vent opening is defined in a land of said at least one valve component, wherein the size of said vent opening is selected such that fluid pressure in said at least one valve component does not exceed a predetermined fluid pressure so as to prevent said first and second valve components from disengaging from each other during reciprocal movement of said first and second valve components in said bore.

* * * * *

UNITED STATES PATENT AND TRADEMARK OFFICE
CERTIFICATE OF CORRECTION

PATENT NO.         : 11,408,447 B2                                              Page 1 of 1
APPLICATION NO.    : 16/405333
DATED              : August 9, 2022
INVENTOR(S)        : David A. Hardin It is certified that error appears in the above-identified patent and that said Letters Patent is hereby corrected as shown below:

In the Claims

Claim 1, Line 1 (Column 5, Line 55): Delete "en", and substitute -an-.

Claim 6, Line 2 (Column 6, Line 49): Delete "," (first occurrence).

Claim 15, Line 3 (Column 8, Line 11): After "vent opening" (first occurrence), add -,-.

<div align="right">

Signed and Sealed this<br>
Thirteenth Day of September, 2022

Katherine Kelly Vidal<br>
*Director of the United States Patent and Trademark Office*

</div>